US006991003B2

(12) United States Patent
Calandra, Jr.

(10) Patent No.: US 6,991,003 B2
(45) Date of Patent: Jan. 31, 2006

(54) SYSTEM AND METHOD FOR AUTOMATICALLY PURIFYING SOLVENTS

(75) Inventor: Peter Calandra, Jr., Hampton Falls, NH (US)

(73) Assignee: M.Braun, Inc., Stratham, NH (US)

( * ) Notice: Subject to any disclaimer, the term of this patent is extended or adjusted under 35 U.S.C. 154(b) by 134 days.

(21) Appl. No.: 10/629,027

(22) Filed: Jul. 28, 2003

(65) Prior Publication Data

US 2005/0023218 A1 Feb. 3, 2005

(51) Int. Cl.
*B65D 31/00* (2006.01)
(52) U.S. Cl. .............. 141/63; 141/11; 141/69; 141/91; 141/192; 210/651; 210/143
(58) Field of Classification Search .............. 141/2, 141/9, 11, 63, 69, 85, 89, 91, 94, 192, 198; 210/634, 650, 651, 143, 282, 294
See application file for complete search history.

(56) References Cited

U.S. PATENT DOCUMENTS 6,787,042 B2 * 9/2004 Bond et al. ............. 210/681

OTHER PUBLICATIONS

Pangborn, et al.; Safe and Convenient Procedure for Solvent Purification;*Organometallics*; 1996, pp. 1518-1520; vol. 15.
Alalmo, et al.; Suggested Modifications to a Distillation-Free Solvent Purification System; *Jounral of Chemical Education*; Jan. 2001; pp. 68; vol. 78; No. 1.
Solvent Purification Using the Grubbs Apparatus Guidelines for Use.

* cited by examiner

*Primary Examiner*—Timothy L. Maust
(74) *Attorney, Agent, or Firm*—Peter A. Nieves; Sheehan Phinney Bass + Green, PA

(57) ABSTRACT

A system for automatically purifying solvents has a solvent holding portion having at least one solvent stored therein, a filter holding portion having at least one filter tube located therein, a peripheral device, and a computer. The computer has a memory and a processor, and the processor is configured by the memory to perform the steps of: receiving an electronic selection of a solvent to be automatically purified; automatically causing the flow of the electronically selected solvent from the solvent holding portion to the at least one filter tube; and automatically filling a collection vessel with the purified solvent.

27 Claims, 10 Drawing Sheets

SYSTEM AND METHOD FOR AUTOMATICALLY PURIFYING SOLVENTS

FIELD OF THE INVENTION

The present invention is generally related to solvent purification and, more particularly, is related to a system and method for safely purifying solvents.

BACKGROUND OF THE INVENTION

As is well known, a solvent is a substance in which another substance is dissolved, thereby forming a solution. Chemical solvents are typically required to be as pure as possible (i.e., free from external elements) prior to use in chemical experiments or simple combination so that results of such chemical experiments or simple combination are as accurate as possible. Specifically, elements such as water and oxygen are not desirable components of a solvent that is to be used in the combination of chemicals, such as during such chemical experiments. Unfortunately, the existence of water and oxygen in a solvent prior to combination with another substance may cause experimental results to be improper and unreliable. Even further, current inexpensive storage methods provide mass storage of solvents within cylinders or other vessels where the solvent has not been purified from elements such as water and oxygen. Therefore, there is a strong desire to use pure solvents (i.e., solvents having minimal to no external elements such as water or oxygen) during chemical experiments, and generally, in situations where the solvent is to be combined with another substance, or solute, thereby providing a desired chemical reaction.

Different methods are presently used in the attempt to remove undesirable elements from a solvent, thereby resulting in a pure solvent. As an example, one present method of removing undesirable elements includes use of boiling procedures. Specifically, a portion of the solvent that is to be purified is boiled with an open flame in an attempt to remove elements such as water from the solvent. Unfortunately, if the solvent is heated to its flash point, an unsafe environment is provided where the solvent may ignite.

To address the abovementioned unsafe environment, manual filtration of solvents has been proposed where filtration is controlled by manual turning of hand valves that introduce the solvent to a filter, and finally to a collection vessel. To use such manual filtration units, the user of the manual filtration unit is required to understand functions provided by the manual filtration unit. Specifically, the user is required to understand which hand valves control flow of the solvent, which hand valves control flow of a working gas used to control flow of the solvent, what order to open the hand valves, etc. In addition, the same manual filtration unit may filter multiple solvents. Lack of knowledge of use of the manual filtration unit may result in opening of a wrong hand valve causing combination of more than one solvent, where, as is well known in the art, the combination of certain solvents may result in emission of toxic gases or combustion. In addition, such lack of knowledge may result in a wrong sequence of hand valve opening causing excessive pressure within the manual filtration unit or a lack of adequate pressure within the manual filtration unit.

In addition, the user of the manual filtration unit must remember to manually shut off flow of the substrate via the appropriate hand valves when a desired amount of filtered substrate is obtained. Unfortunately, if the flow of substrate is not manually shut off, the solvent may overflow the collection vessel or continue to flow after removal of the collection vessel, thereby providing an unsafe environment where toxic gases may be emitted or, even worse, a combustible solvent may overflow from the manual filtration unit to the floor or general working area.

Even further, manual filtration units provide the resulting filtered solvent in an open environment where minor fumes associated with the filtered solvent may be emitted into a working environment. Unfortunately, gathering of these fumes may provide an environment that is harmful to the user of the manual filtration unit and those in the immediate area. In addition, the open environment subjects the filtered solvent to Oxygen, which may be an undesirable element in a chemical experiment involving use of the filtered solvent.

Thus, a heretofore unaddressed need exists in the industry to address the aforementioned deficiencies and inadequacies.

SUMMARY OF THE INVENTION

Embodiments of the present invention provide a system and method for automatically purifying solvents and providing a safe environment during and after purification.

Briefly described, in architecture, one embodiment of the system, among others, can be implemented as follows. The system has a solvent holding portion having at least one solvent stored therein, a filter holding portion having at least one filter tube located therein, a peripheral device, and a computer. The computer has a memory and a processor, and the processor is configured by the memory to perform the steps of: receiving an electronic selection of a solvent to be automatically purified; automatically causing the flow of the electronically selected solvent from the solvent holding portion to the at least one filter tube; and automatically filling a collection vessel with the purified solvent.

The present invention can also be viewed as providing methods for automatically purifying solvents and providing a safe environment during and after purification. In this regard, one embodiment of such a method, among others, can be broadly summarized by the following steps: receiving an electronic selection of a solvent to be automatically purified; automatically causing the flow of the electronically selected solvent from a solvent container into at least one filter tube; automatically removing unwanted elements from the electronically selected solvent via use of the at least one filter tube, resulting in a purified solvent; and automatically filling a collection vessel with the purified solvent.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The present purification systems and methods provide automatic and safe purification of a solvent. It should be noted that, while the following describes use of the systems and methods including configuration prior to use by a user, the purification systems may also be pre-configured in accordance with specific requirements associated with a desired filtered solvent.

Figure 1:
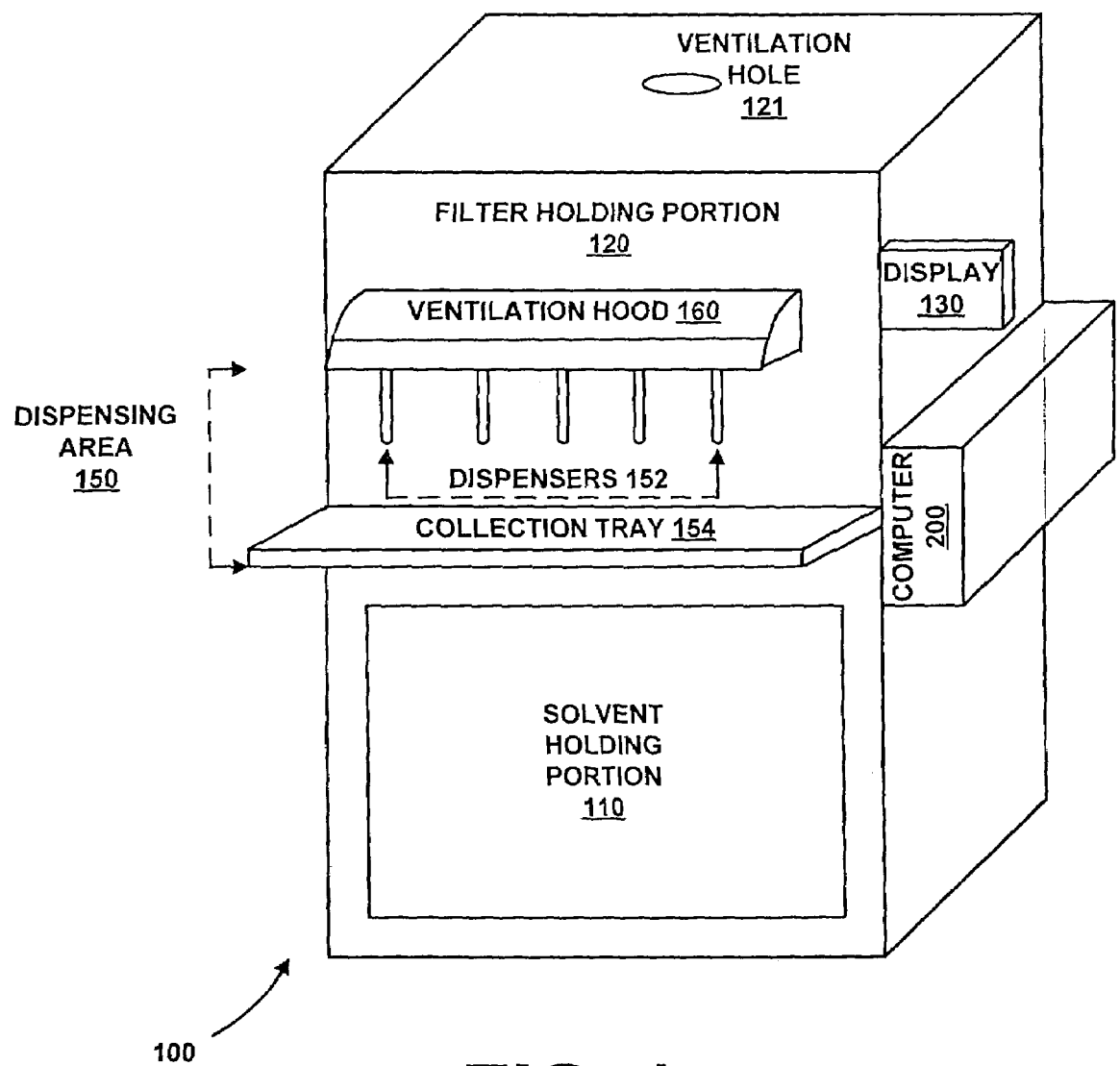
FIG. 1 is a perspective front view of the purification system, in accordance with a first exemplary embodiment of the invention.
Figure 2:
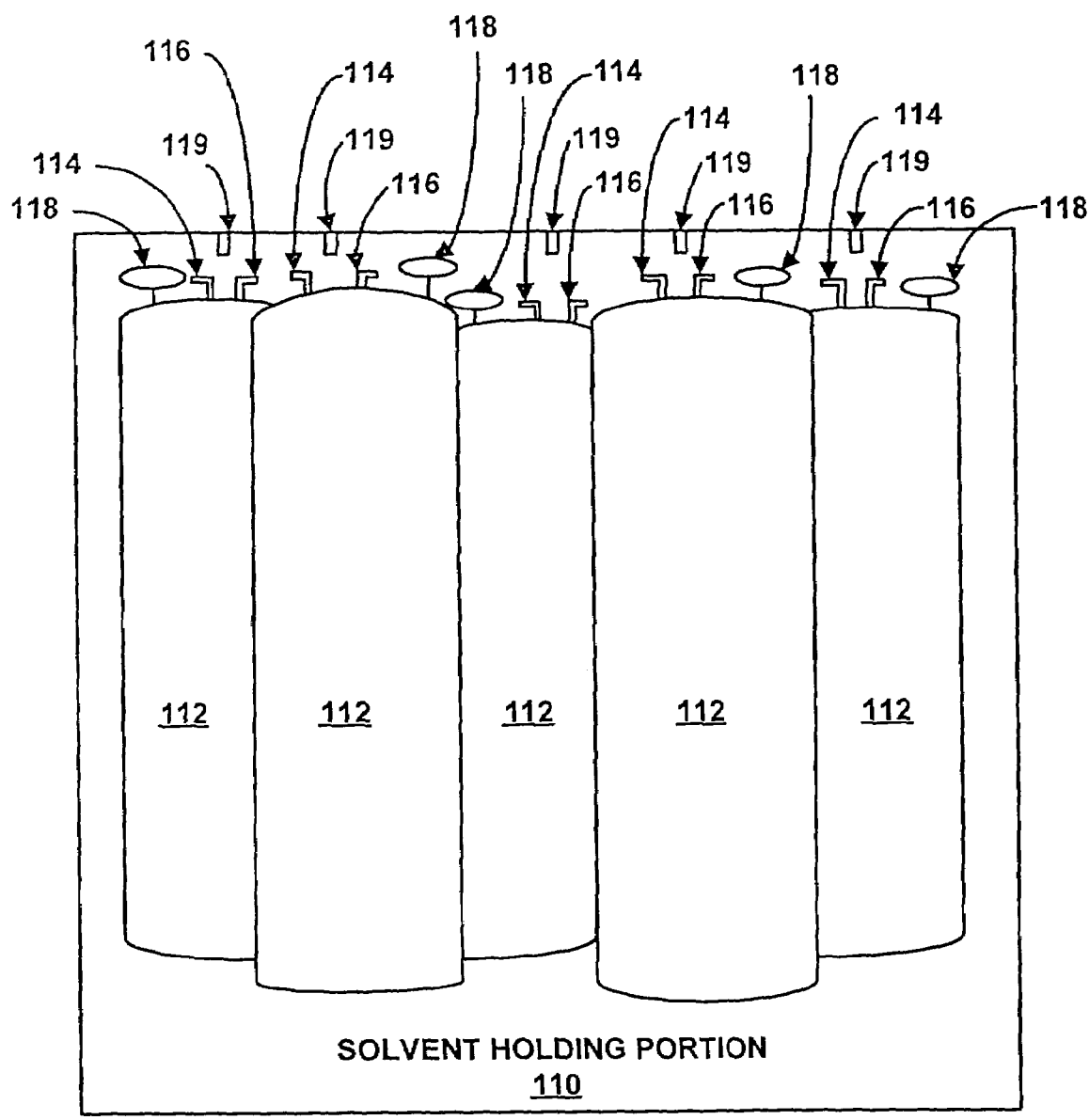
FIG. 2 illustrates the solvent holding portion of the purification system of FIG. 1.

FIG. 1 is a perspective front view of the purification system 100, in accordance with a first exemplary embodiment of the invention. As is shown by FIG. 1, the purification system 100 contains a solvent holding portion 110, a filter holding portion 120 having a ventilation hole 121, a display 130, a computer 200, a dispensing area 150 having a series of dispensers 152 and a collection tray 154, and a ventilation hood 160. The solvent holding portion 110 holds a number of solvent holding containers therein. FIG. 2 is a perspective view of the solvent holding portion 110 and is described immediately hereafter. While the purification system 100 in accordance with the first exemplary embodiment of the invention provides the solvent holding portion 110 and the filter holding portion 120 in separate locations, one having ordinary skill in the art would appreciate that the solvent holding portion 110 and the filter holding portion 120 may instead be located within the same location.

FIG. 2 illustrates the solvent holding portion 110 of the purification system 100. As is shown by FIG. 2, the solvent holding portion 110 has a number of solvent containers 112 therein. As is known by those having ordinary skill in the art, a typical solvent container 112 holds a solvent in a pressurized environment, where the pressure is not high enough to push the solvent from the solvent container 112. Each different solvent is stored within a separate solvent container 112. In accordance with the first exemplary embodiment of the invention, the solvent containers 112 have at least an output port 114 and an input port 116. The output port 114 is used to expel solvent from the solvent container 112, as is explained in detail below. Alternatively, the input port 116 is used to allow a working gas, such as an inert gas (e.g., Nitrogen, Argon, or Helium) to be introduced to the solvent container 112, thereby forcing the solvent out of the solvent container 112 via the output port 114 due to increased pressure within the solvent container 112. Use of the solvent container 112 is further described below. It should be noted that a source of the working gas may be located external from the purification system 100, yet connected to the input port 116, or the source of the working gas may be located within the purification system 100.

The solvent container 112 also contains a solvent valve 118 to allow for the flow of solvent with the introduction of the working gas into the solvent container 112. The solvent valve 118 also allows for manual shutting off of access to the solvent by closing the output port 114, thereby preventing the output port 114 from expelling solvent. Of course, the solvent container 112 may also contain other devices known to be present on containers such as, but not limited to, a pressure gauge.

The solvent holding portion 110 of the purification system 100 also contains a number of valve connectors 119, which connect an inner portion of the solvent holding portion 110 to the filter holding portion 120. Preferably, while a first portion of the valve connector 119 is located within the solvent holding portion 110, a second portion of the valve connector 119 is located within the filter holding portion 120. As is further described below, a separate valve connector 119 is assigned to each separate solvent container 112. In addition, the output port 114 of the solvent container 112 is connected to the first portion of the valve connector 119, while the second portion of the valve connector 119 is connected to a filter tube 122 (FIG. 3) located within the filter holding portion 120 of the purification system 100. The filter tubes 122 (FIG. 3) and the filter holding portion 120 are discussed in detail below with reference to the description of FIG. 3.

The solvent holding portion 110 of the purification system 100 may also be fire resistant. By making the solvent holding portion 110 fire resistant, solvents stored within the solvent containers 112 are protected from combustion in case of fire. In addition, in accordance with an alternative embodiment of the invention, the solvent holding portion 110 may have an opening therein for allowing connection to a means for providing ventilation. Specifically, if the solvent containers 112 are not perfectly sealed, fumes from the solvents may fill the solvent holding portion 110 of the purification system 100. Unfortunately, fumes from certain solvents may be flammable, and the combination of different solvent fumes may pose an even more hazardous situation. In addition, the fumes may be poisonous to a user of the purification system 100 during replacement of solvent containers 112, or simply at any time of opening the solvent holding portion 110. Therefore, having a means for ventilation, such as an air purification, attached to the solvent holding portion 110 minimizes storage of hazardous fumes within the solvent holding portion 110. It should be noted that ventilation may instead be provided by allowing communication of air between the solvent holding portion 110 and the filter holding portion 120, where the filter holding portion 120 has an air purification system attached thereto (explained in detail below).

Returning to FIG. 1, the display 130 may be any type of display, such as, but not limited to, a touch screen display, a computer monitor, a television screen, etc. In accordance with the first exemplary embodiment of the invention, the display 130 is a touch screen display that serves as a peripheral device that allows the user of the purification system 100 to configure and interact with the purification system 100 in accordance with functionality defined by the computer 200. Use of the display 130 and functionality provided by the present purification system 100 is described in detail below.

In accordance with a second exemplary embodiment of the invention, the display 130 may be located remote from the purification system 100. In fact, both the display and the computer 200 may be located remote from the purification system 100, where the user communicates with the purification system 100 via a means of communication such as, but not limited to, wireless communication or the Internet. By providing for remote control of the purification system 100 the user may control more than one purification system 100 and would not be subjected to harmful fumes if ventilation, as mentioned above, is not utilized.

Figure 3:
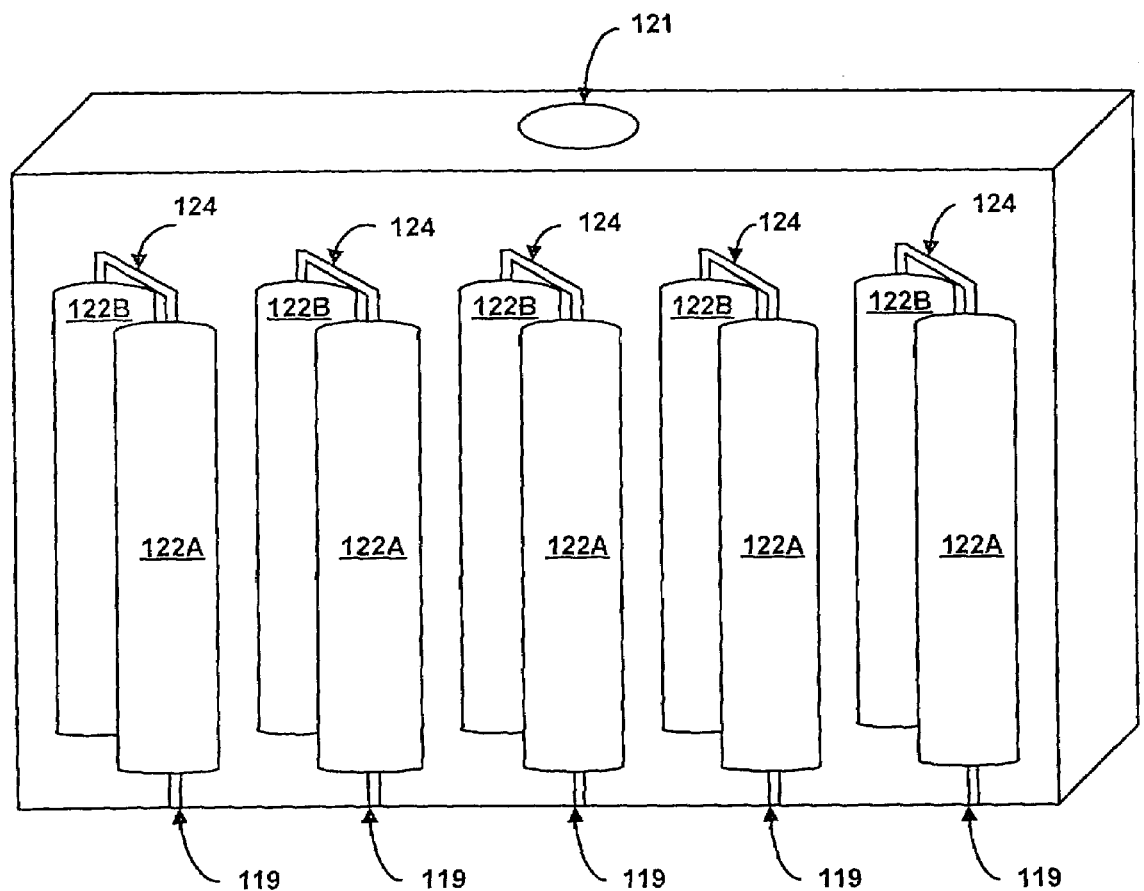
FIG. 3 is a perspective view of the filter holding portion of the purification system of FIG. 1.

FIG. 3 is a perspective view of the filter holding portion 120 of the purification system 100, in accordance with the first exemplary embodiment of the invention. As is shown by FIG. 3, the filter holding portion 120 has a number of filter tubes 122 therein. In accordance with the first exemplary embodiment of the invention, which accommodates five solvents, ten filter tubes 122 are located within the filter holding portion 120. Specifically, as is described below, there are five first filter tubes 122A and five second filter tubes 122B. The second portion of each valve connector 119 is connected to a bottom portion of one of the first filter tubes 122A. It should be noted that if the present purification system 100 instead provided one level of purification, there would be five filter tubes 122 within the filter holding portion 120 instead of ten. In addition, if the present purification system 100 instead had more than two levels of purification, there would be more filter tubes 122 within the filter holding portion 120.

A top portion of one of the first filter tubes 122A is connected to a top portion of one of the second filter tubes 122B via a filter tube connector 124. The filter tube connector 124 may be a metal connector, or may be made of any other material that is capable of being connected to the top portions of the filter tubes 122 and preventing oxygen from entering the solvent containers 112.

Each filter tube 122 removes particulate, water, and oxygen from the solvent during the purification process (as is described below). Different filter media may be utilized to remove the particulate, water, and oxygen. As an example, glass wool may be provided at an entrance and at an exit of the filter tube 122. The glass wool located at the entrance of the filter tube 122 serves to remove particulate located within the solvent, while the glass wool located at the exit of the filter tube 122 may serve to keep filter media from coming out of the filter tube 122. A2 Alumina Molecular Sieve may also be located within the filter tube 122 for removing water from the solvent, thereby providing a dry solvent. In addition, Q5 Copper Catalyst may be located within the filter tube 122 for removal of oxygen from the solvent.

Bottom portions of the second filter tubes 122B are connected to at least one dispenser 152 (FIG. 1) via, for example, metal leads (not shown). In addition, the filter holding portion 120 contains the ventilation hole 121 for allowing an air purification system to be attached to the purification system 100. Attachment of an air purification system to the ventilation hole 121 allows the air purification system to keep air within the purification system 100 free from impurities associated with the solvent.

Returning to FIG. 1, the dispensing area 150 contains a series of solvent dispensers 152 and a collection tray 154. In accordance with the first exemplary embodiment of the invention, one solvent dispenser 152 is assigned to dispense one of the solvents, after purification is completed by the purification system 100. The solvent dispenser 152 dispenses the solvent into a collection vessel that is placed on the collection tray 154. By having each individual solvent dispenser 152 assigned to a separate solvent, combination of solvents is prevented.

The collection vessel may be any collection vessel that is known to those having ordinary skill in the art. In accordance with the first exemplary embodiment of the invention, the collection vessel is maintained in a vacuum environment where oxygen and water are not present. Maintaining collection vessels in a vacuum environment is performed via use of a vacuum pump, as is explained in detail below.

Optionally, the ventilation hood 160 may be provided to capture fumes associated with the solvent during and after dispensing of solvent. As an example, the ventilation hood 160 may collect harmful solvent fumes that are the result of spillage of the solvent during or after filling the collection vessels, where the spilled solvent remains in the collection tray 154. The ventilation hood 160 draws the fumes into the filter holding portion 120, where, as mentioned above, an air purification unit removes harmful fumes from the filter holding portion 120.

Figure 5:
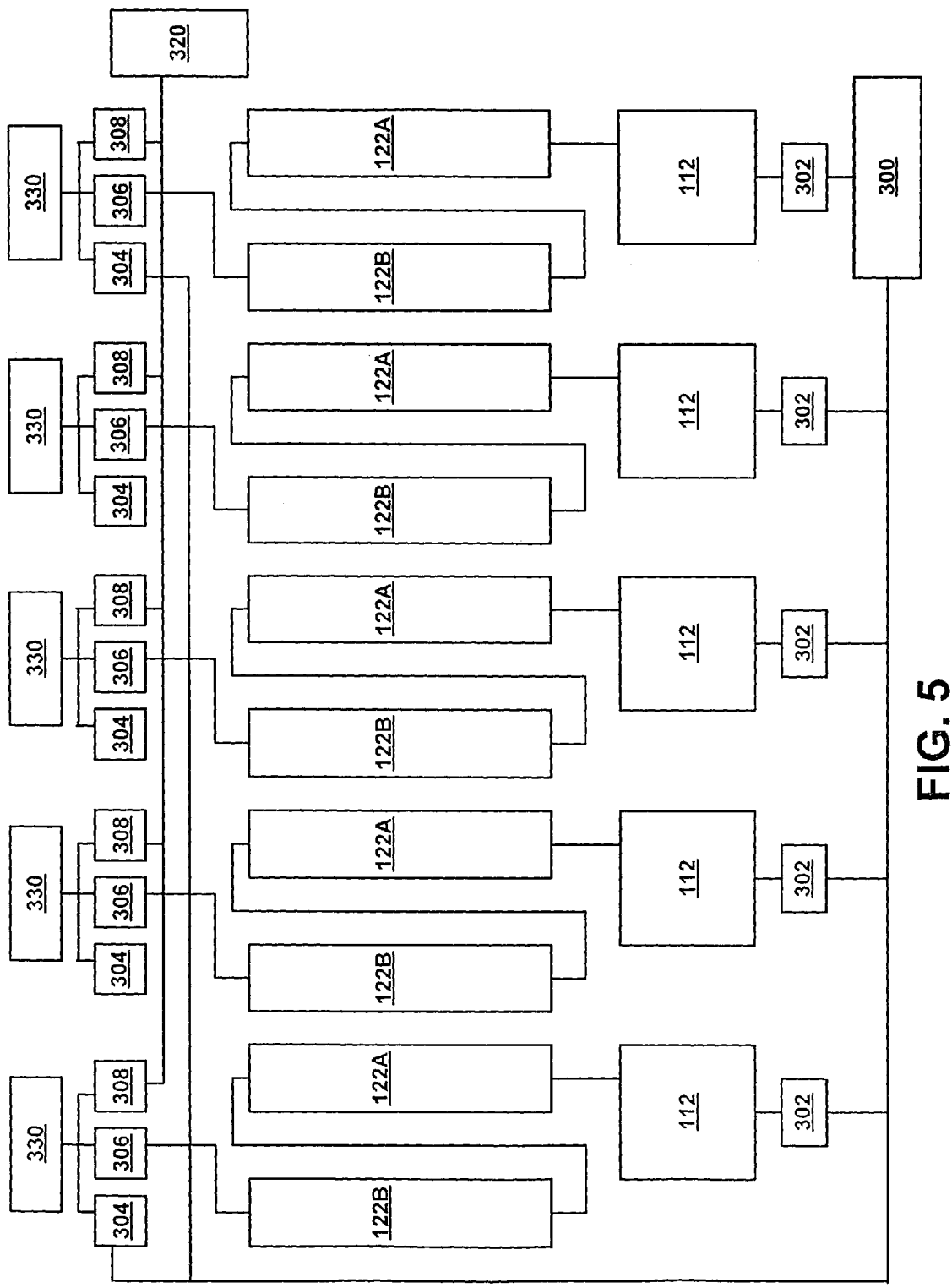
FIG. 5 is a flow process diagram that illustrates flow of gas and liquid within the purification system of FIG. 1, in accordance with the first exemplary embodiment of the invention.

FIG. 5 is a flow process diagram that illustrates flow of gas and liquid within the purification system 100, in accordance with the first exemplary embodiment of the invention. It should be noted that the flow process assumes that five solvents are available for purification by the present purification system 100. Of course, additional, or fewer solvents may be provided for by the present purification system 100. In addition, the flow process diagram assumes that two levels of filtration are performed. It should be noted that more or fewer levels of filtration might be provided.

As is shown by FIG. 5 a supply of working gas 300, such as nitrogen, or a different inert gas, is connected to each of the solvent containers 112. Preferably, check valves 302 are located between the inert gas supply 300 and the solvent containers 112. The check valve 302 controls the flow of the working gas into the solvent container 112, and therefore, due to increased pressure, the flow of solvent out of the solvent container 112. In addition, the check valve 302 prevents the backflow of gases associated with the solvent from seeping into a container that may hold the working gas. The supply of working gas 300 is also connected to a collection vessel 330, where the collection vessel 330 is utilized to collect the solvent in its purified form after purification is completed by the purification system 100. In addition, between the supply of working gas 300 and the collection vessel 330 is a working gas valve 304 that controls an amount of working gas that will be allowed into the collection vessel 330, as is described in detail below. Preferably, the working gas valves 304 are pneumatic valves.

As is mentioned above, the flow of solvent from the solvent container 112 may also be controlled by the solvent valve 118 (FIG. 2), which allows for manual shutting off of access to the solvent by preventing the output port 114 (FIG. 2) of the solvent container 112 from expelling solvent.

When solvent flows from the solvent container 112 the filter tubes 122, namely the first filter tube(s) 122A and then the second filter tube(s) 122B, receive the solvent. It should be noted that, for ease of explanation, while FIG. 5 illustrates numerous solvent containers 112, first filter tubes 122A, second filter tubes 122B, collection vessels 330, etc., the present description typically describes a single solvent flow path unless it is necessary to describe other flow paths for clarification purposes. It should also be noted that since each solvent goes through its own filtration vessels (i.e., filter tubes), the purification system 100 provides each solvent with closed loop, dedicated filtration, thereby preventing a single filtration vessel, or tube, from receiving more than one solvent for filtration. Thus, unintentional combination of solvents, which, as has been mentioned above, may be harmful, is prevented.

As has been mentioned above, the first filter tube 122A and the second filter 122B remove particulate, water, and oxygen from the received solvent. After filtration has been performed by the filter tubes 122, solvent may be collected in the collection vessels 330. Optionally, collection of solvent is regulated by collection valves 306. Specifically, the collection valves 306 may be used to control when the filtered solvent is allowed to flow to the collection vessels 330. Preferably, the collection valves 306 are pneumatic valves. In addition, a manual flow control valve (not shown) may be utilized, in addition to a manual check valve, to prevent dripping of solvent.

A vacuum pump 320 may be connected to the flow process via vacuum valves 308. The vacuum valves 308 may be utilized to control providing of a vacuum environment within the collection vessels 330 (explained below), thereby removing oxygen from the collection vessels 330.

Figure 8:
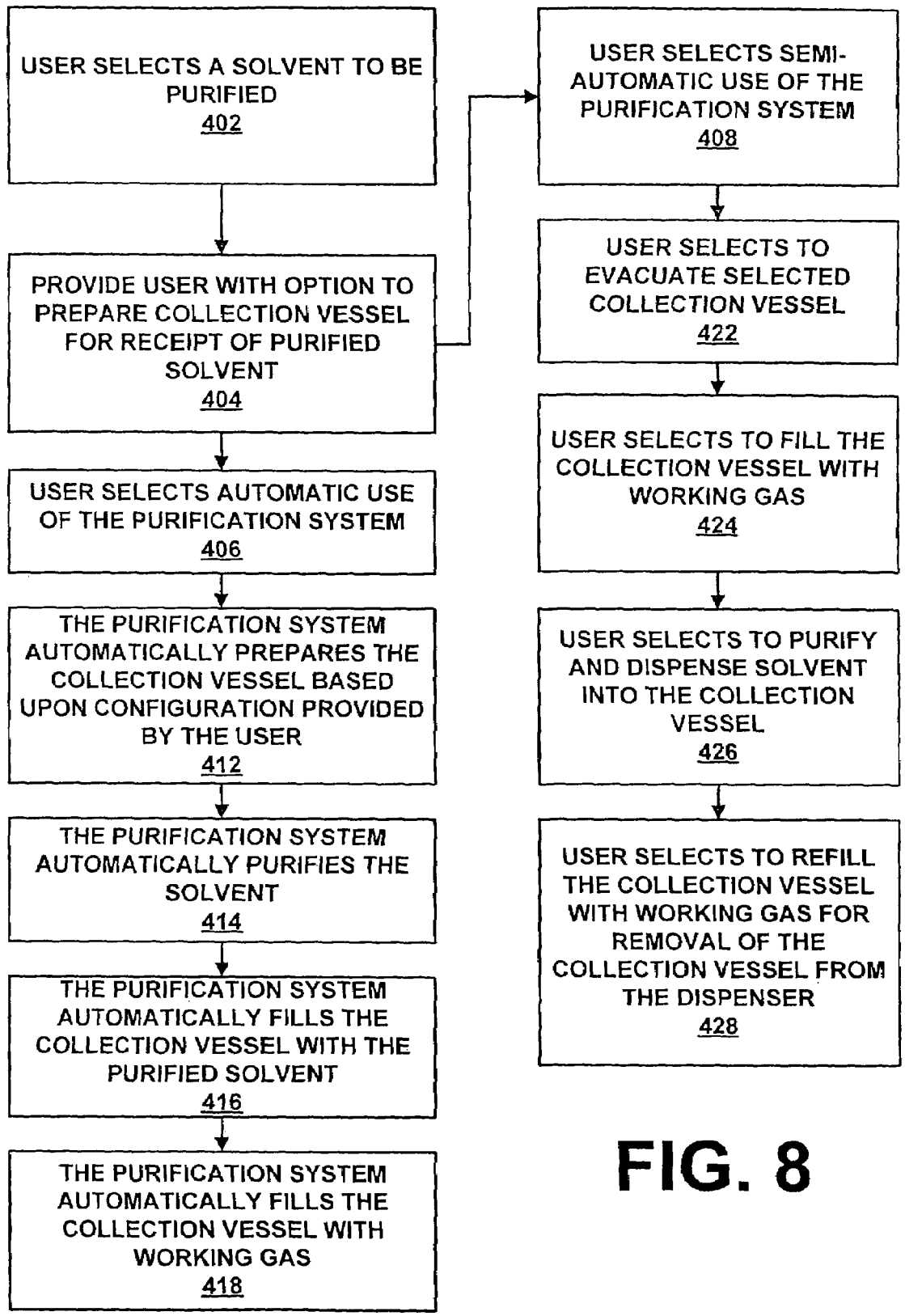
FIG. 8 is a flow chart illustrating user interaction with the purification system of FIG. 1, in accordance with the first exemplary embodiment of the invention.

The flow diagram of FIG. 5 is described in more detail below with reference to FIG. 8. Specifically, the description of FIG. 8 provides a detailed summary of steps performed by the purification system 100 and user interaction with the purification system 100.

Figure 4:
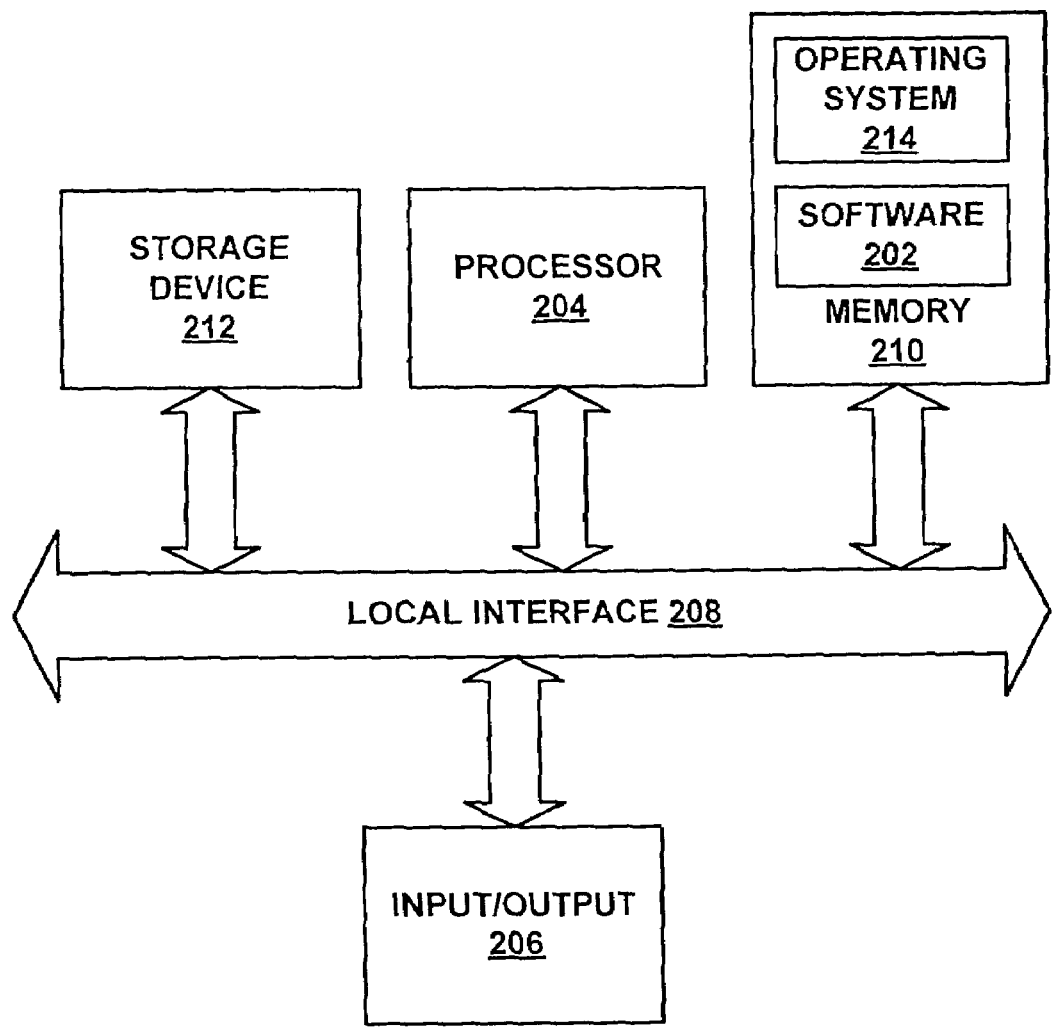
FIG. 4 is a block diagram further illustrating the computer located within the purification system of FIG. 1.

Returning to FIG. 1, the purification system 100 also provides the computer 200. FIG. 4 is a block diagram further illustrating the computer 200, in accordance with the first exemplary embodiment of the invention. It should be noted that portions of the purification system 100 can be implemented in software (e.g., firmware), hardware, or a combination thereof. Functions performed by the purification system 100 are preferably defined by software, as an executable program, and are executed by a special or general purpose digital computer, such as a personal computer (PC; IBM-compatible, Apple-compatible, or otherwise), workstation, minicomputer, or mainframe computer. FIG. 4 provides an example of this general purpose computer 200 that defines and instructs execution of functions provided by the purification system 100.

Software that defines functionality performed by the purification system 100 is denoted by reference numeral 202. Generally, in terms of hardware architecture, as shown in FIG. 4, the computer 200 includes a processor 204, memory 210, and one or more input and/or output (I/O) devices 206 (or peripherals) (e.g., the display 130) that are communicatively coupled via a local interface 208. The local interface 208 can be, for example but not limited to, one or more buses or other wired or wireless connections, as is known in the art. The local interface 208 may have additional elements, which are omitted for simplicity, such as controllers, buffers (caches), drivers, repeaters, and receivers, to enable communications. Further, the local interface 208 may include address, control, and/or data connections to enable appropriate communications among the aforementioned components. It should be noted that the computer 200 may also have a storage device 212 therein. The storage device 212 may be any nonvolatile memory element (e.g., ROM, hard drive, tape, CDROM, etc.).

The processor 204 is a hardware device for executing the software 202, particularly that stored in memory 210. The processor 204 can be any custom made or commercially available processor, a central processing unit (CPU), an auxiliary processor among several processors associated with the computer 200, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc, or a 68 automated self-service series microprocessor from Motorola Corporation.

The memory 210 can include any one or combination of volatile memory elements (e.g., random access memory (RAM, such as DRAM, SRAM, SDRAM, etc.) and non-volatile memory elements. Moreover, the memory 210 may incorporate electronic, magnetic, optical, and/or other types of storage media. Note that the memory 210 can have a distributed architecture, where various components are situated remote from one another, but can be accessed by the processor 204.

The software 202 located in the memory 210 may include one or more separate programs, each of which comprises an ordered listing of executable instructions for implementing logical functions. In the example of FIG. 4, as mentioned above, the software 202 includes functionality performed by the present purification system 100 in accordance with the present invention. Optionally, an operating system (O/S) 214 may also be located within the computer 200. A nonexhaustive list of examples of suitable commercially available operating systems 214 is as follows: (a) a Windows operating system available from Microsoft Corporation; (b) a Netware operating system available from Novell, Inc.; (c) a Macintosh operating system available from Apple Computer, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers or personal data assistants (PDAs) (e.g., PalmOS available from Palm Computing, Inc., and Windows CE available from Microsoft Corporation). The operating system 214 essentially controls the execution of other computer programs, such as the purification system software 202, and provides scheduling, input-output control, file and data management, memory management, and communication control and related services.

The purification system software 202 is a source program, executable program (object code), script, or any other entity comprising a set of instructions to be performed. When a source program, the program needs to be translated via a compiler, assembler, interpreter, or the like, which may or may not be included within the memory 210, so as to operate properly in connection with the O/S 214. Furthermore, the purification system software 202 can be written as: (a) an object oriented programming language, which has classes of data and methods, or (b) a procedure programming language, which has routines, subroutines, and/or functions, for example but not limited to, C, C++, Pascal, Basic, Fortran, Cobol, Perl, and Java.

The I/O devices 206 may include input devices, for example but not limited to, a keyboard, mouse, scanner, microphone, the display 130 (FIG. 1), touchscreens, etc. Furthermore, the I/O devices 206 may also include output devices, for example but not limited to, a printer, display, etc. Finally, the I/O devices 206 may further include devices that communicate both inputs and outputs, for instance but not limited to, a modulator/demodulator (modem; for accessing another device, system, or network), a radio frequency (RF) or other transceiver, a telephonic interface, a bridge, a router, etc. In accordance with the present invention, at least one of the I/O devices 206 is the display 130 of FIG. 1.

If the computer 200 is a PC, workstation, or the like, the purification software 202 in the memory 210 may further include a basic input output system (BIOS) (omitted for simplicity). The BIOS is a set of essential software routines that initialize and test hardware at startup, start the O/S 214, and support the transfer of data among the hardware devices. The BIOS is stored in ROM so that the BIOS can be executed when the computer 200 is activated.

When the computer 200 is in operation, the processor 204 is configured to execute the purification system software 202 stored within the memory 210, to communicate data to and from the memory 210, and to generally control operations of the computer 200, and therefore, the purification system 100, pursuant to the software 202.

When functionality associated with the present purification system 100 is implemented in software 202, as is shown in FIG. 4, it should be noted that the purification system software 202 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The purification system software 202 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the purification system 100 may be completely implemented in hardware, the purification system 100 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array (s) (PGA), a field programmable gate array (FPGA), etc.

For the purposes of illustration, a partial software implementation of the purification system 100 is described herein, including configuration of the purification system 100 and use of the purification system 100. However, this example in no way should be considered limiting.

It should be noted that prior to use of the purification system 100, namely, prior to configuration and use, portions of the purification system 100 may be prepared for use. As an example, a solvent container 112 may be prepared for use prior to use of the purification system 100. Specifically, it may be desirable to purge a solvent container 112 of excess oxygen prior to use. One method of purging the solvent container 112 may be to input a working gas into the solvent container 112 while bleeding excess oxygen. The check valve 302 (FIG. 5) that controls the flow of the working gas into the solvent container 112 may be utilized to allow the working gas to enter the solvent container 112, yet prevent backflow of gases associated with the solvent from seeping into a container holding the working gas. In addition, an over pressure relief valve (not shown) may be used to prevent excessive pressure build up within the solvent container 112. A valve degassing outlet (not shown) may also be used for allowing the excess oxygen in the solvent container 112 to be purged from the container 112. The purged excess oxygen is expelled into the solvent holding portion 110 and, via the air filtration system (e.g., a heating, ventilating, and air conditioning (HVAC) system) connected to the filter holding portion 120 of the purification system 100, pulled from the solvent holding portion 110, into the filter holding portion 120, and out of the purification system 100. Other methods of preparing the solvent containers 112 for use may also be performed prior to use of the purification system 100.

Configuration

In accordance with the first exemplary embodiment of the invention, the purification system 100 is configured prior to use. The following describes an example of a configuration process for the purification system 100. It should be noted that it is not necessary for the purification system 100 to be configured prior to use. Alternatively, the purification system 100 may be preconfigured so as to alleviate the need for configuration prior to use. In addition, a previous configuration, or default configuration, may be stored within the memory 210 so as to alleviate the need for configuration.

Figure 6:
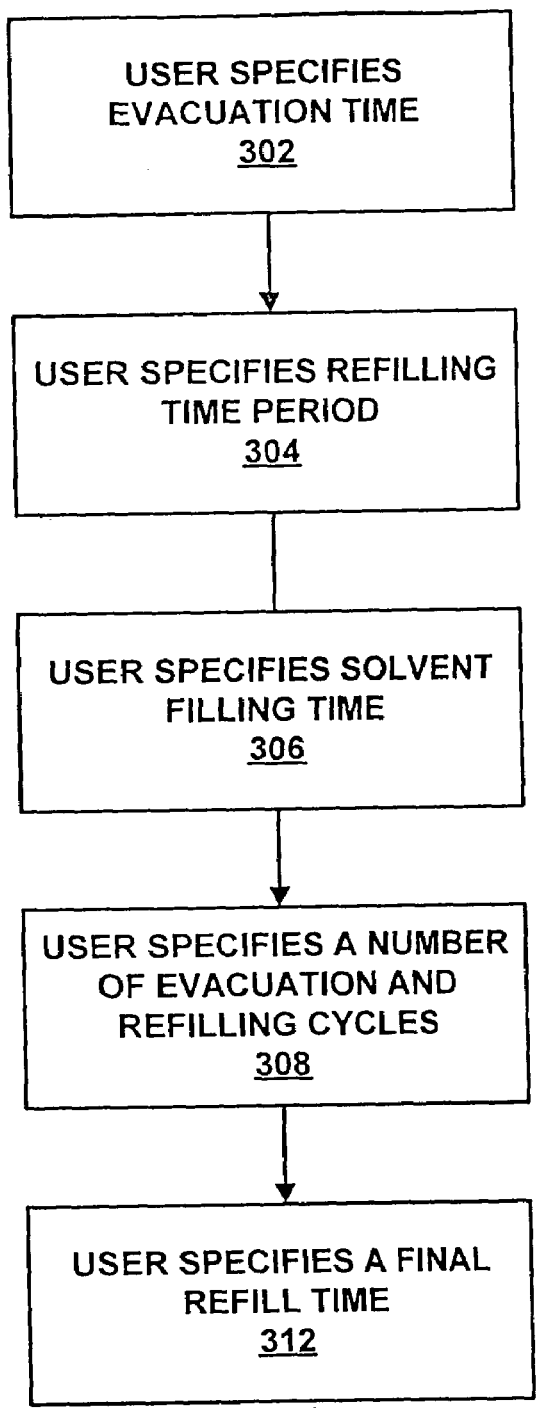
FIG. 6 is a flow chart illustrating configuration of the purification system of FIG. 1, in accordance with the first exemplary embodiment of the invention.

FIG. 6 is a flow chart illustrating configuration of the purification system 100, in accordance with the first exemplary embodiment of the invention. It should be noted that any process descriptions or blocks in flow charts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

Turning now to FIG. 6, as is shown by block 302, the user specifies an evacuation time, which is a time period in which oxygen is to be removed from the collection vessel 330. The process of evacuating oxygen from the collection vessel 330 is described below and therefore is not further described here.

The user also specifies a time period for refilling the collection vessel 330 with the working gas (block 304). The process of refilling the collection vessel with the working gas is described below and therefore is not further described here.

During configuration, the user also specifies a solvent filling time (block 306), which is an amount of time that a selected solvent is allowed to fill the collection vessel 330. The longer the solvent filling time, the more solvent that is collected within the collection vessel 330. In accordance with an alternative embodiment of the invention, the user may instead specify a measurement of solvent to be collected.

In addition, the user may specify a number of evacuations and refilling cycles to be performed prior to filling the collection vessel 330 with purified solvent (block 308). The number of evacuations corresponds to the number of times oxygen is withdrawn from the collection vessel 330. In addition, the number of refills corresponds to the number of times the working gas is used to fill the collection vessel 330. Therefore, the higher the number of evacuation and refilling cycles, the less oxygen and moisture that is left in the collection vessel 330 and the more the collection vessel 330 is left in a vacuum state.

As is shown by block 312, the user specifies a final refill time for filling the collection vessel 330 with the working gas. Since, after evacuating and refilling the collection vessel 330 multiple times, the collection vessel 330 is within a vacuum state, the final refill time adds a small portion of working gas to the collection vessel 330 to allow the collection vessel 330 to be removed from the corresponding dispenser 152.

Figure 7:
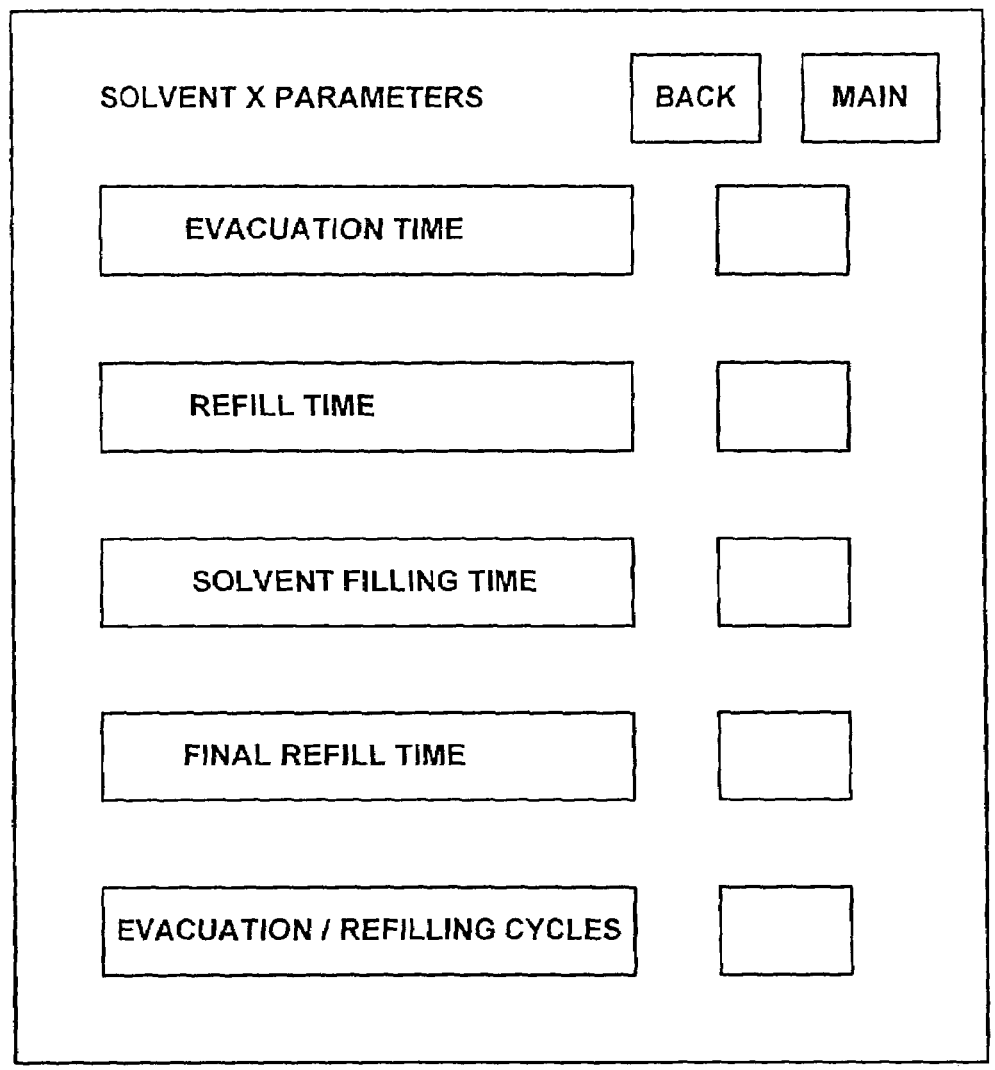
FIG. 7 is an example of a screen made available by the system software, which allows the user to configure the purification system of FIG. 1, prior to use.

An example of a screen made available by the system software 202, which allows the user to configure the purification system 100 prior to use, is provided by FIG. 7. As is shown by FIG. 7, the user may specify an evacuation time, a refill time, a solvent filling time, a final refill time, and a number of evacuation/refilling cycles.

Purification System Use

Figure 9:
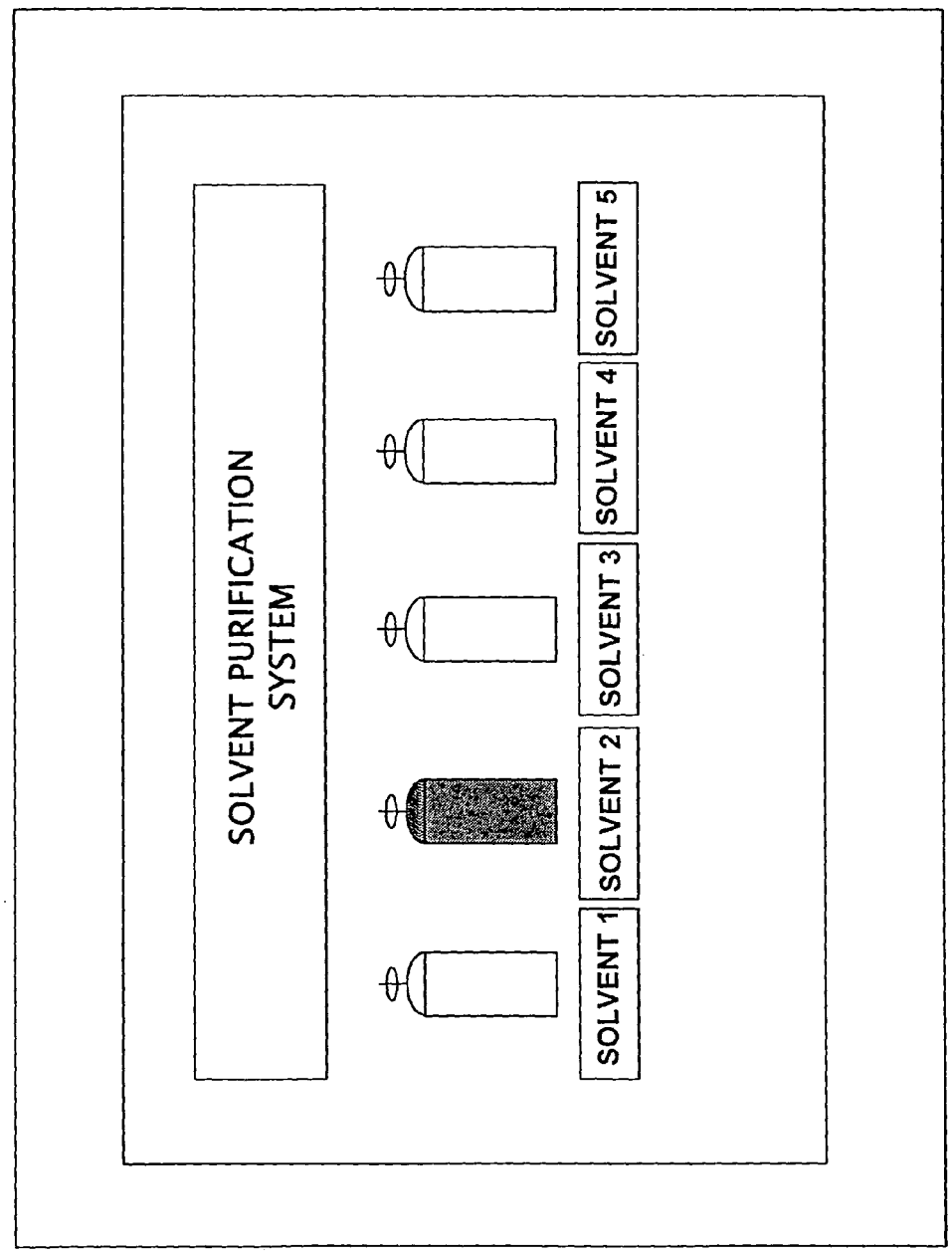
FIG. 9 is an example of a screen made available by the system software, which allows the user to select a solvent.

FIG. 8 is a flow chart illustrating user interaction with the purification system 100, in accordance with the first exemplary embodiment of the invention. As is shown by block 402, the user selects a solvent to be purified. The user may select one of the five solvents made available by the purification system 100 via the display 130 by pressing a portion of the display 130 associated with the solvent of choice. An example of a screen made available by the system software 202, which allows the user to select a solvent, is provided by FIG. 9. As is shown by FIG. 9, each solvent is listed for selection by the user. After selection of the solvent, the icon associated with the selected solvent changes color to signify selection. FIG. 9 illustrates selection of solvent number two. Of course, other methods of specifying which solvent has been selected, may be utilized.

Returning to FIG. 8, as is shown by block 404, the user is provided with an option to prepare the collection vessel 330 associated with the selected solvent for receipt of the solvent in purified form. The user may select to automatically have the purification system 100 prepare the collection vessel 330, fill the collection vessel 330 with solvent, and prepare the collection vessel 330 for removal, in accordance with the configuration provided above (block 406). Alternatively, the user may select a semi-automatic selection (block 408), which allows direct interact with the purification system 100, as explained below, to prepare the collection vessel 330 for filling, adding the purified solvent, and preparing the collection vessel 330 for removal from the dispenser 152. Alternatively, the user may select not to prepare the collection vessel 330 for receipt of the solvent.

It should be noted that, optionally, when the user selects either automatic or semi-automatic use, the system software 202 provides a screen to the user, via the display 130, that asks the user to acknowledge that they have attached the collection vessel 330 to the dispenser 152. The user is then required to press an acknowledge button 501 (FIG. 10) (designated as ACK), via the display 130, to acknowledge attachment of the collection vessel 330. The acknowledge button 501 (FIG. 10) is shown by FIG. 10, as is described below.

Figure 10:
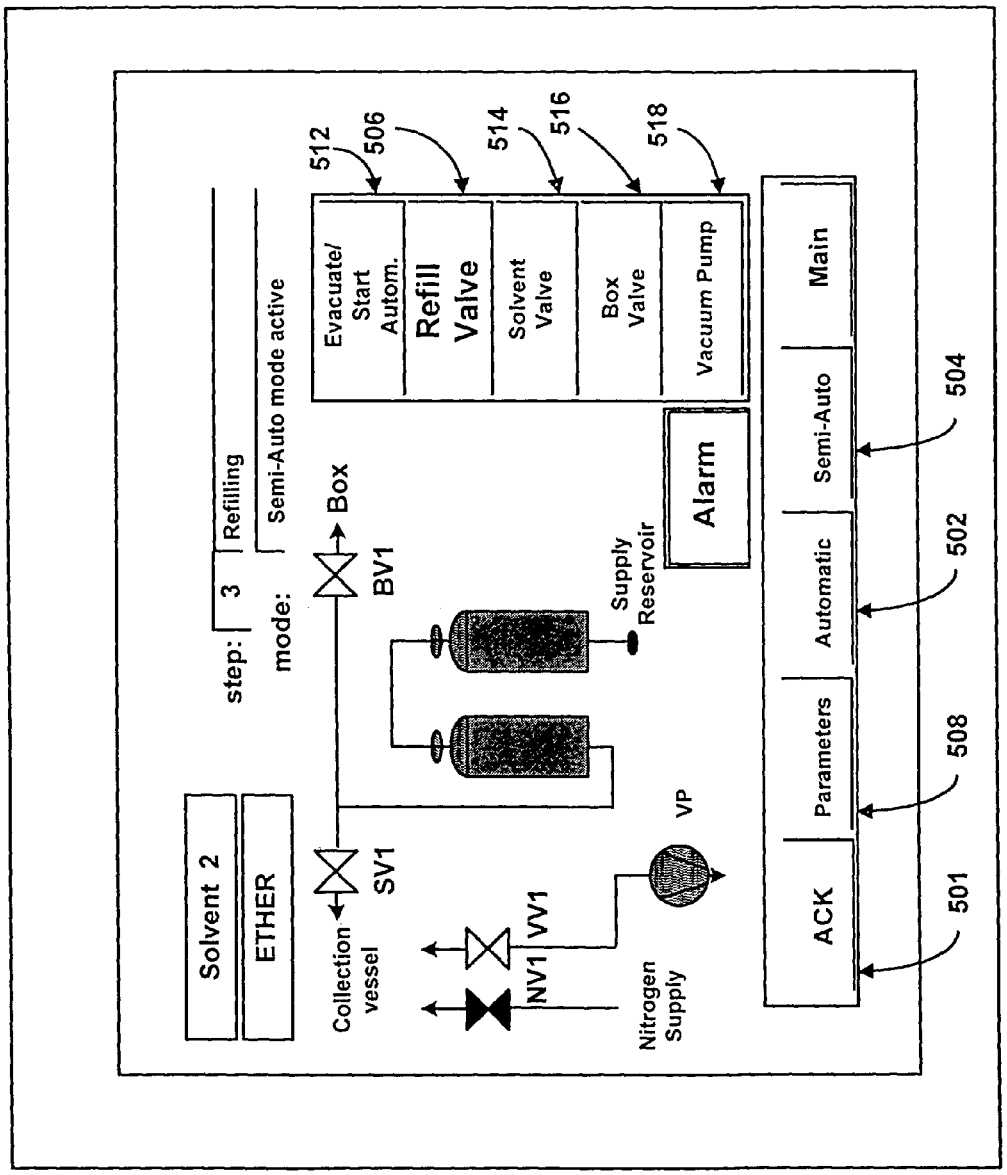
FIG. 10 is an example of an interaction screed made available by the system software.

An example of a screen made available by the system software 202, which allows the user to select either to have the purification system 100 automatically prepare the collection vessel 330, or to prepare the collection vessel 330 semi-automatically, is provided by FIG. 10. As is shown by FIG. 10, an automatic button 502 is provided for selection by the user if he/she wants automatic use of the purification system 100. In addition, a semi-automatic button 504 is provided for selection by the user if he/she wants semi-automatic use of the purification system 100.

The screen of FIG. 10 also illustrates progress of the purification system 100 during preparation of the collection vessel 330, purification of the solvent, insertion of the solvent into the collection vessel 330, and final preparation of the collection vessel 330 for removal from the dispenser 152. Looking to FIG. 10, the screen shows that the nitrogen supply, or any working gas, is being used and that the working gas valve 304 (shown as NV1) is open. It should be noted that the screen of FIG. 10 assumes that the purification system 100 may also be connected, via a box valve, to a glove box as is designated by the word "Box."

Use of the screen of FIG. 10 differs in accordance with whether the user selects to use the purification system automatically (block 406) or semi-automatically (block 408). Specifically, if the user selects to use the purification system automatically (block 406) the screen of FIG. 10 highlights buttons, namely an evacuate/start automatic button 512, a refill valve button 506, a solvent valve button 514, a box valve button 516, and a vacuum pump button 518, in accordance with the portion of the purification system 100 being used and the step being performed by the purification system 100. Alternatively, if the user selects to use the purification system 100 semi-automatically (block 408), the buttons 512, 506, 514, 516, and 518, may be manually selected by the user to control the purification system 100 semi-automatically.

As is shown by FIG. 10, during refilling of the collection vessel 330 the refill valve button 506 is highlighted, signifying that the working gas valve 304 is open and the purification system 100 is refilling the collection vessel 330. In addition the vacuum pump 320 is designated as VP, while the collection valve 306 for the selected solvent is designated as SV1. It should be noted that a top portion of the screen shows the step currently being performed by the purification system 100. As an example, the screen of FIG. 10 shows that the purification system 100 is currently refilling and in semi-automatic mode. In addition, selection of a parameters button 508 opens the screen of FIG. 7, where the user may configure the purification system 100, as has been explained above.

If the user selects to allow the purification system 100 to automatically prepare the collection vessel 330, the purification system 100 automatically prepares the collection vessel 330 in accordance with the evacuation time, refill time, and evacuation/refilling cycles previously specified by the user during configuration of the purification system 100 (block 412). Specifically, the system software 202 causes the vacuum valve 308 associated with the collection vessel 330 to open for the user defined time limit, thereby allowing removal of oxygen from the collection vessel 330 via use of the vacuum pump 320. The system software 202 then causes the working gas valve 304 associated with the collection vessel 330 to open for the user defined refill time, thereby allowing the collection vessel 330 to be filled with the working gas. This process is then repeated in accordance with the number of evacuation/refilling cycles defined by the user.

After automatic preparation of the collection vessel 330, the system software 202 causes the check valve 302 to open, thereby controlling flow of the working gas into the solvent container 112, and therefore, due to increased pressure, controlling the flow of solvent out of the solvent container 112 and into the filter tubes 122 (block 414). The system software 202 then causes the associated collection valve 306 to open for the user specified solvent filling time, thereby allowing filtered solvent to flow to the collection vessel 330 (block 416). After completion of solvent filling (block 416), the system software 202 causes the associated working gas valve 304 to be opened for the user specified final refill time, thereby decreasing the vacuum environment within the collection vessel 330 and allowing the collection vessel 330 to be removed from the associated dispenser 152 (block 418).

Alternatively, if the user selects to directly interact with the purification system 100 (i.e., semi-automatic mode) (block 408), the user selects to evacuate the associated collection vessel 330 by pressing the evacuate/start automatic button 512 (block 422). The system software 202 then causes the vacuum valve 308 associated with the collection vessel 330 to open, thereby allowing removal of oxygen from the collection vessel 330 via use of the vacuum pump 320. Removal of oxygen from the collection vessel 330 may be stopped by the user pressing the evacuate/start automatic button 512 a second time.

In accordance with an alternative embodiment of the invention, removal of oxygen may continue until the user configured evacuation time is completed. In accordance with another alternative embodiment of the invention, the system software 202 may have predefined therein a destination specific pressure value for the collection vessel 330. When the destination specific pressure value is obtained within the collection vessel 330, the system software 202 may cause the vacuum valve 308 to close, thereby ceasing removal of oxygen from the collection vessel 330. An option may be provided to allow the user to continue use of the vacuum pump 320 until the user has obtained a desired oxygen level within the collection vessel 330.

After removal of oxygen from the collection vessel 330, the user may select to fill the collection vessel with the working gas by selecting the refill valve button 506 (block 424). Removal of oxygen and refilling with the working gas may be repeated until the user feels the collection vessel 330 is prepared for filling by the purified solvent.

When preparation of the collection vessel 330 is complete, the user may select to purify and dispense the selected solvent by selecting the solvent valve button 514 (block 426). After selection of the solvent valve button 514 to purify and dispense the selected solvent, the system software 202 causes the check valve 302 to open, thereby controlling flow of the working gas into the solvent container 112, and therefore, due to increased pressure, the flow of solvent out of the solvent container 112 and into the filter tubes 122. The system software 202 then causes the associated collection valve 306 to open, thereby allowing filtered solvent to flow to the collection vessel 330. It should be noted that the user may stop filling of the collection vessel 330 by pressing the solvent valve button 514 a second time. Alternatively, filling of the collection vessel 330 may end in accordance with the user configured solvent filling time.

After completion of solvent filling (block 426), the user may select to refill the collection vessel 330 with a small portion of working gas, thereby decreasing the vacuum environment within the collection vessel 330 and allowing the collection vessel 330 to be removed from the associated dispenser 152 (block 428). It should be noted that refilling may be performed by the user pressing the refill valve button 506.

It should be noted that, while the above purification system 100 utilizes a series of valves to automatically open and close portions of the purification system 100, the valves may be replaced by any device that would open and close portions of the purification system 100 as mentioned above. As an example, electronic switches may be utilized to replace the valves.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A system for automatically purifying solvents, comprising:
    a solvent holding portion having at least one solvent container therein, wherein each solvent container has one solvent therein;
    a filter holding portion having at least one filter tube located therein, wherein said filter holding portion is in communication with said solvent holding portion via at least one valve connector, wherein a first portion of said valve connector is located within said filter holding portion and a second portion of said valve connector is located within said solvent holding portion;
    a peripheral device; and
    a computer having a memory and a processor, said processor being configured by said memory to perform the steps of:
    receiving an electronic selection of a solvent to be automatically purified;
    automatically causing the flow of said electronically selected solvent from said solvent holding portion to said at least one filter tube; and
    automatically filling a collection vessel with said purified solvent.

2. The system of claim 1, wherein said step of automatically filling said collection vessel is performed for a time period specified by a user of said system.

3. The system of claim 1, wherein said filter tube removes elements selected from the group consisting of impurities, water and oxygen.

4. The system of claim 1, wherein said received electronic selection is received from a location remote from said system.

5. The system of claim 1, wherein said filter holding portion and said solvent holding portion are located within one common area.

6. The system of claim 1, wherein said filter holding portion and said solvent holding portion are located within separate areas.

7. The system of claim 1, wherein said filter holding portion has an air purification system attached thereto, said air purification system being capable of cleaning air within said filter holding portion and within said solvent holding portion.

8. The system of claim 1, further comprising a source of working gas, and wherein said solvent is stored within a solvent container that is located within said solvent holding portion.

9. The system of claim 8, wherein said step of automatically causing the flow of said electronically selected solvent is performed by said processor automatically causing the opening of a check valve that controls flow of said working gas into said solvent container.

10. The system of claim 1, wherein said processor is further configured by said memory to perform the step of automatically preparing said collection vessel for receipt of said purified solvent after said step of receiving said electronic selection of said solvent.

11. The system of claim 10, wherein said system is connected to a vacuum device capable of removing oxygen from said collection vessel, said step of automatically preparing said collection vessel, further comprising the steps of:
said processor causing opening of a vacuum valve for allowing said vacuum device to remove oxygen from said collection vessel;
said processor causing closing of said vacuum valve;
said processor causing opening of a working gas valve for allowing filling of said collection vessel with said working gas; and
said processor causing repeating of said steps of causing opening of said vacuum valve to remove said oxygen, causing closing of said vacuum valve, and causing opening of said working gas valve to fill said collection vessel with said working gas.

12. The system of claim 11, wherein said step of automatically preparing said collection vessel is performed based upon a user provided configuration, wherein during said configuration, said user specifies a time period for removing oxygen from said collection vessel, a time period for adding said working gas to said collection vessel, and a number of times to repeat said steps of removing said oxygen and adding said working gas.

13. The system of claim 11, wherein said processor is further configured by said memory to perform the step of briefly filling said collection vessel with said working gas after said step of automatically filling said collection vessel with said purified solvent to allow said collection vessel to be removed from said system.

14. A method of automatically purifying solvents, comprising the steps of:
receiving an electronic selection of a solvent to be automatically purified;
automatically causing the flow of said electronically selected solvent from a solvent container into at least one filter tube by adding a working gas to said solvent container;
automatically removing unwanted elements from said electronically selected solvent via use of said at least one filter tube, resulting in a purified solvent; and
automatically filling a collection vessel with said purified solvent.

15. The method of claim 14, further comprising the step of receiving a solvent fill time, wherein said step of automatically filling said collection vessel is performed for said received solvent fill time.

16. The method of claim 14, wherein said step of electronically selecting a solvent to be automatically purified is performed via use of a peripheral device.

17. The method of claim 16, wherein said peripheral device is a touch screen.

18. The method of claim 14, wherein said step of automatically causing the flow of said electronically selected solvent further comprises automatically opening a check valve that controls the flow of said working gas into said solvent container.

19. The method of claim 14, wherein said unwanted elements are particulate, oxygen and water.

20. The method of claim 14, further comprising the step of automatically preparing said collection vessel for receipt of a purified solvent after said step of receiving said electronic selection of said solvent.

21. The method of claim 20, wherein said step of automatically preparing said collection vessel further comprises the steps of:
removing oxygen from said collection vessel;
adding a working gas to said collection vessel; and
repeating said steps of removing said oxygen and adding said working gas.

22. The method of claim 21, wherein said step of automatically preparing said collection vessel is performed based upon a user provided configuration, wherein during said configuration, said user specifies a time period for removing oxygen from said collection vessel, a time period for adding a working gas to said collection vessel, and a number of times to repeat said step of repeating said steps of removing said oxygen and adding said working gas.

23. The method of claim 14, further comprising the step of automatically adding said working gas to said collection vessel after said step of automatically filling said collection vessel with said purification solvent.

24. A system for purifying solvents, comprising:
means for receiving an electronic selection of a solvent to be automatically purified;
means for automatically causing the flow of said electronically selected solvent from a solvent container, where said solvent container is located within a solvent holding portion of said system and wherein said solvent container has one solvent therein, into at least one filter tube, where said filter tube is located within a filter holding portion of said system;
means for automatically removing unwanted elements from said electronically selected solvent via use of said at least one filter tube, resulting in a purified solvent; and
means for automatically filling a collection vessel with said purified solvent.

25. The system of claim 24, further comprising a means for receiving a solvent fill time, wherein said means for automatically filling said collection vessel automatically fills said collection vessel for said received solvent fill time.

26. The system of claim 24, further comprising means for adding a working gas to said solvent container.

27. The system of claim 24, further comprising means for automatically preparing said collection vessel for receipt of a purified solvent after receiving said electronic selection of said solvent.

* * * * *